United States Patent
Makihara et al.

(10) Patent No.: US 6,396,974 B1
(45) Date of Patent: May 28, 2002

(54) OPTICAL SWITCH

(75) Inventors: Mitsuhiro Makihara, Higashiyamato; Fusao Shimokawa, Tokyo; Makoto Sato, Hitachinaka, all of (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 0 days.

(21) Appl. No.: 09/567,586

(22) Filed: May 10, 2000

(30) Foreign Application Priority Data

May 11, 1999  (JP) ............................................. 11-129406

(51) Int. Cl.[7] .............................. G02B 6/26; G02B 6/42
(52) U.S. Cl. ........................................................ 385/17
(58) Field of Search ............................. 385/17, 18, 40, 385/125

(56) References Cited

FOREIGN PATENT DOCUMENTS

| JP | 50-55334 | 5/1975 |
|----|----------|--------|
| JP | 09-133932 | 5/1997 |
| JP | 10-73775 A | 3/1998 |
| JP | 11-129406 | 2/2000 |

*Primary Examiner*—Ricky Mack
*Assistant Examiner*—Alicia M Harrington
(74) *Attorney, Agent, or Firm*—Venable; Robert J. Frank

(57) ABSTRACT

An optical switch of the present invention has a plurality of elements arranged in each of a row and a column direction thereof, where the slits of each element are located at corresponding crossing point between an optical wave guide extending to a row direction and a column direction. A heating element, provided near each of the slits, with a predetermined resistance value, and liquid with predetermined optical characteristic which moves within the slit. The liquid is moved to switch the optical paths at the crossing point between the optical wave-guides. A first electric wirings connecting the heating element of elements in the same row direction in condition that ratio of the resistance value of each heating element to the predetermine resistance value has a predetermined value or smaller, and a second electric wiring connecting the heating element of the element in the same column direction together in condition that a ratio of the resistance value of each heating element to the predetermine resistance value has a predetermined value or smaller.

5 Claims, 9 Drawing Sheets

US 6,396,974 B1

OPTICAL SWITCH

This application is based on Patent Application No. 11-129406(1999) filed May 11, 1999 in Japan, the content of which is incorporated hereinto by reference.

BACKGROUND OF THE INVENTION

1. Field of the Invention

The present invention relates to an optical switch for use in an optical communication system or the like for routing or switching an optical path, and is particularly effective in application to a large-scale matrix optical switch.

2. Description of the Related Art

A variety of optical switches have been proposed, in which a refractive index-matching liquid with a refractive index substantially equal to that of the optical waveguides is sealed in slits formed at crossing points of crossing optical waveguides and moved to switch optical paths at the crossing points of the optical waveguides.

For example, the optical switch disclosed in Japanese Patent Application Laid-open No. 9-133932 (1997) has m optical waveguides not crossing one another in a substrate and n optical waveguides not crossing one another therein, wherein the m optical waveguides cross the n optical waveguides. This optical switch further includes slits each having wall surfaces inclined at a predetermined angle relative to optical axes of these optical waveguides and means (micro heaters) each provided at a corresponding one of the crossing points for generating heat near the corresponding slit. An optically transparent liquid having a refractive index approximate to the refractive index of the optical waveguides is sealed in a part of each of the slits. This optical switch switches optical paths by allowing the micro heaters to generate heat to move the liquid within the slits.

FIG. 1 is an electric wiring diagram of a conventional optical switch according to the above publication.

One element 31 in the illustrated matrix comprises two micro heaters 32a, 32b connected in series to different diodes 33a, 33b, and the two series circuits are connected in parallel so that one of the diodes has a polarity opposite to the other diode. One of two common connected nodes of each series circuit is connected to an upper layer wiring, while the other common connected node is connected to a lower layer wiring.

In addition, Japanese Patent Application Laid-open No. 10-73775 (1998) discloses a method for assembling the optical switch proposed by the above publication. Specifically, as shown in FIG. 2, a silica-based optical waveguide layer 22 is formed on a substrate 21 made of silicon, and a thin metal film such as titanium or chromium with relatively high resistance and another thin metal film such as gold with low resistance are deposited on the optical waveguide layer 22, utilizing the sputtering method or the vacuum evaporation method. Then, a combined method of a photolithography process and a dry etching process is used for treating both the thin films to produce micro heaters 26, electric wirings 25, and a slit, and a silicon layer is then deposited on the optical waveguide layer 22. Subsequently, a substrate 27 made of Pyrex Glass (trade mark) is bonded to the silicon layer with anodic bonding so as to cover the slit, thereby forming a slit 24 at a crossing point between optical waveguides 23. On the other hand, an injection path 29 is formed in a bonding surface of the optical waveguide layer 22 or the substrate 27. Thus, the optical switch according to the above publication is obtained by precisely injecting an appropriate amount of refractive index-matching liquid 31 into the slit 24, through an injection port 30 of the injection path 29 by a method such as pressure control and then blocking the injection port 30 with epoxy resin or the like.

In applying such a conventional optical switch to a large-scale optical matrix switch, the following problems occur.

The above matrix requires at least two micro heaters 26 in one element of the matrix switch. That is, the at least two micro heaters 26 are required to move the refractive index-matching liquid 31 within one slit 24. Since three electric wirings 25 are required to independently supply power to the micro heaters 26 of one element, (2n+1) electric wirings 25 are required for an optical switch comprising n elements arranged in a single row even if a common wiring is used as grounds for the micro heaters 26. Furthermore, (2n+1)×m electric wirings 25 are required for an (n×m) optical switch with n elements arranged in m rows.

In addition, to form the optical matrix switch on an electric circuit board, together with a drive circuit for the micro heaters 26 or another circuit mounted thereon, electric wirings 25 of the optical switch must be arranged on an end surface of the optical waveguide layer 22 so that the electric wirings 25 of the optical switch and electric wirings of the electric circuit board can be connected together utilizing the wire bonding method or the like. Thus, the electric wirings 25 must be arranged in such a manner that sufficiently large intervals are provided between the elements, significantly increasing in size of the optical switch. Consequently, it is difficult to manufacture the electric wirings 25 or the like utilizing a combined method of photolithography and dry etching.

In addition, in the above optical switch, to arrange n×m elements on the optical waveguide layer 22 and to form an injection port 30 corresponding to each slit 24 in each of the side wall surfaces of the substrate 27, large intervals are required between the elements and each slit must be covered by anodically bonding a plurality of substrates 27 together, thereby requiring a large amount of time and labor for manufacturing. On the other hand, to form an injection port 30 corresponding to each slit 24 in a top surface of the substrate 27, injection ports 30 penetrating the optical waveguide layer 22 in a fashion corresponding to optical waveguides 23 formed at a pitch of 250 μm must be densely formed in a substrate 27 of thickness 0.3 mm, for which anodic bonding can be easily carried out. Consequently, formation of the injection ports 30 is very difficult even with dry etching or the micro blasting method. Then, if the thickness of the substrate 27 is reduced to facilitate manufacturing, the substrate 27 may be broken during anodic bonding.

On the other hand, in supplying power to the micro heaters 32a, 32b in FIG. 1, power consumption may increase rapidly according to increasement in wiring length due to the augmented scale of the switch.

As another problem, current may leak at wirings other than those leading to the desired micro heaters or at other micro heaters, thereby preventing power from being supplied only to the desired micro heaters for the purpose of driving the liquid. This problem grows serious as the switch scale enlarges.

In addition, if the above optical switch has an n≠m matrix configuration, the leakage current differs between a row direction and a column direction, whereby other micro heaters may be heated to cause the switch elements to malfunction. Even without the malfunction of the switch elements, the leakage current may disadvantageously vary the optical characteristics of the optical switch.

The present invention provides an optical switch that can solve these problems, and it is a first object of the present invention to provide an optical switch that facilitates size reduction while improving productivity even if it is of a matrix type.

It is a second object of the present invention to provide an optical switch that can efficiently supply power to desired micro heaters while reducing power consumption.

It is a third object of the present invention to provide an optical switch that can prevent malfunctions and variations in optical characteristics caused by leakage current even if it has an n≠m matrix configuration.

It is a fourth object of the present invention to provide an optical switch that can eliminate the adverse effects of leakage current.

SUMMARY OF THE INVENTION

The present invention accomplishes an optical switch comprising a plurality of elements arranged in each of a row and a column direction thereof, each of the elements comprising slit located at corresponding crossing point between an optical waveguide extending to a row direction and an optical waveguide extending to the column direction, heating means, provided near each of the slit, with a predetermined resistance value, and liquid with predetermined optical characteristics which moves within the slit depending on heat generated by the heating means. The liquid is moved to switch optical paths at the crossing point between the optical waveguides. The optical switch comprises first electric wirings connecting the heating means of the elements in the same row direction together in condition that a ratio of the resistance value of each heating means to the predetermined resistance value has a predetermined value or smaller, second electric wirings connecting the heating means of the elements in the same column direction together in condition that a ratio of the resistance value of each heating means to the predetermined resistance value has a predetermined value or smaller, and an insulating layer interposed between the first electric wirings and the second electric wirings.

Furthermore, the present invention accomplishes an optical switch comprising a plurality of elements arranged in each of a row and a column direction thereof, each of the elements comprising slit located at corresponding crossing point between an optical waveguide extending to a row direction and an optical waveguide extending to the column direction, a pair of heating means provided near each of the slit, and liquid with predetermined optical characteristics which moves within the slit depending on heat generated by either of the pair of heating means. The liquid is moved to switch optical paths at the crossing points between the optical waveguides. The optical switch comprises a first series circuit having first backflow prevention means connected to one of the pair of heating means, a second series circuit having second backflow prevention means connected to the other of the pair of heating means, first electric wirings connected to the first and second series circuits in common in the same row direction, second electric wirings independently connected to the first and second series circuits in the same column direction, and an insulating layer interposed between the first electric wirings and the second electric wirings.

Furthermore, the present invention accomplishes an optical switch comprising a plurality of elements arranged in each of a row and a column direction thereof, each of the elements comprising slit located at corresponding crossing point between an optical waveguide extending to a row direction and an optical waveguide extending to the column direction, heating means provided near each of the slit, and liquid with predetermined optical characteristics which moves within the slit depending on heat generated by the heating means. The liquid is moved to switch optical paths at the crossing point between the optical waveguides. The optical switch comprises main injection paths each formed between adjacent the elements to the row or column direction of the element and having opposite ends in communication with an exterior and sub injection paths each having one end in communication with a corresponding one of the slit in the element, and the other end in communication with a portion of the main injection path which is nearest to the slit.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS (First Embodiment)

At first, an embodiment of the optical switch according to the present invention will be described with reference to the perspective view in FIG. 3. This perspective view also represents a third embodiment, which will be described below.

Figure 1:
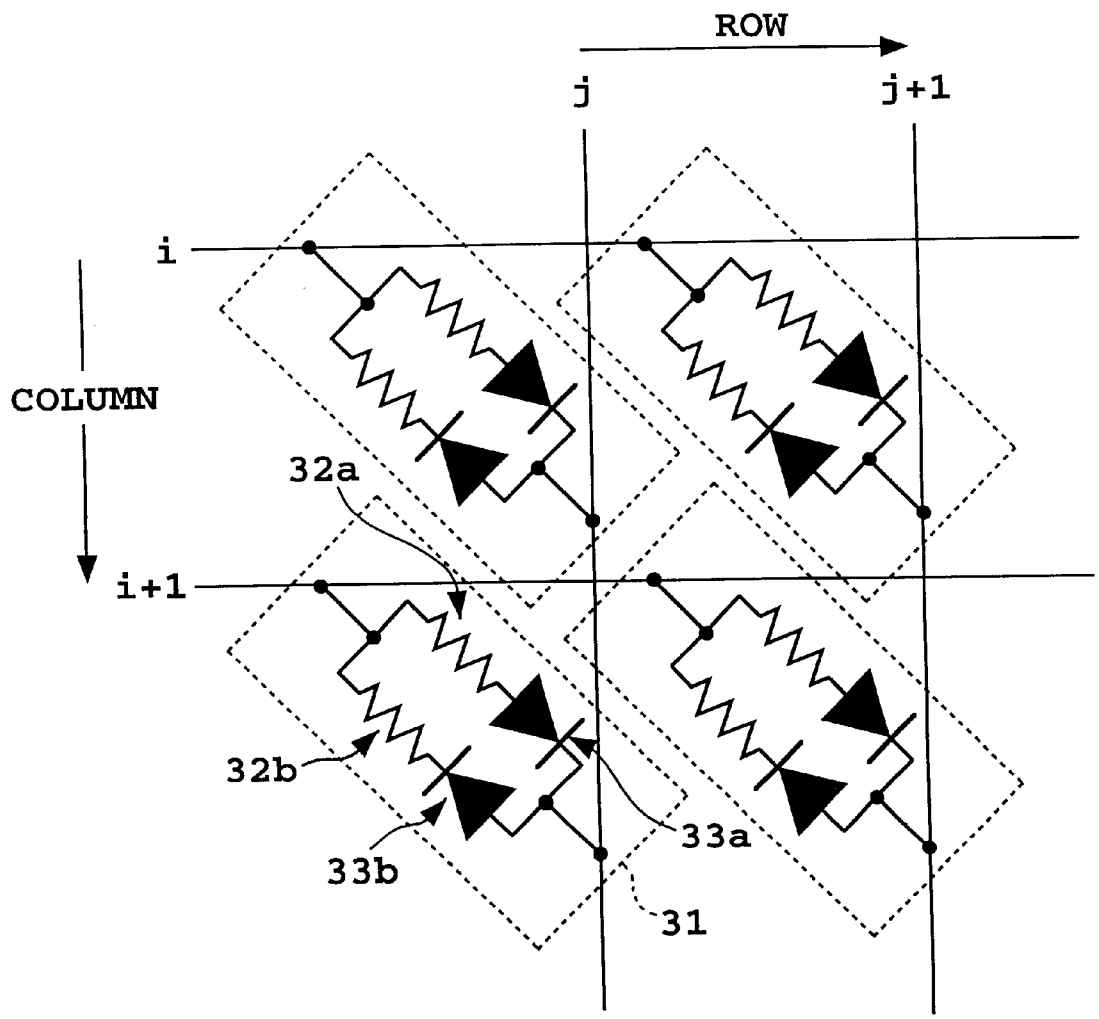
FIG. 1 shows an electric wiring diagram of an example of a conventional optical switch.
Figure 2:
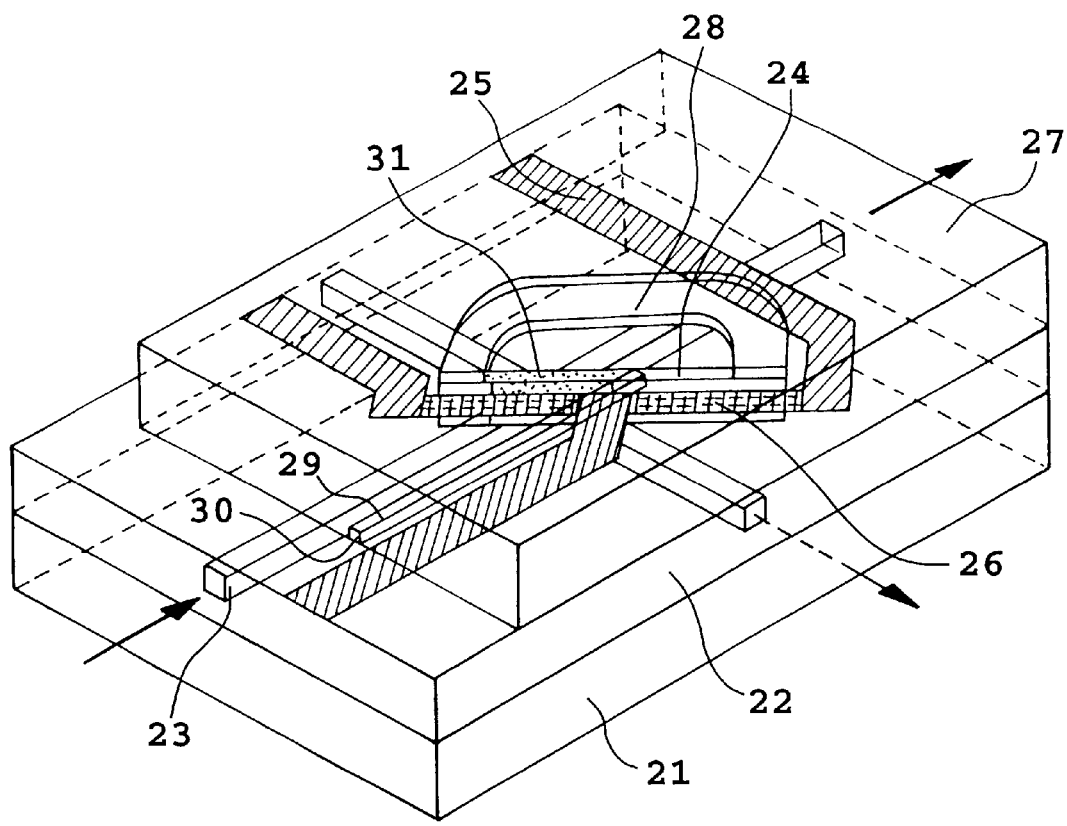
FIG. 2 shows a schematic configuration diagram of an example of a conventional optical switch.
Figure 3:
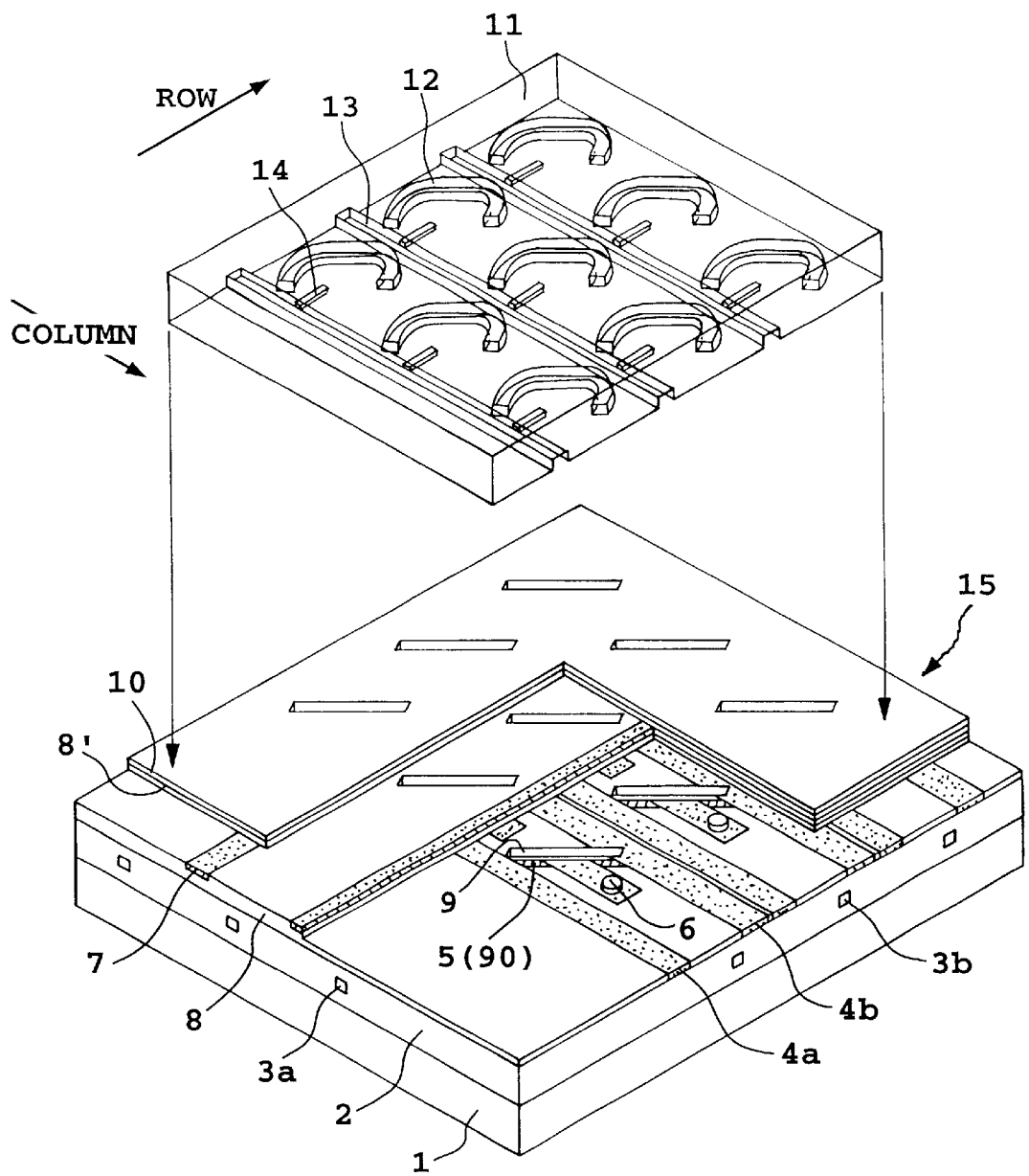
FIG. 3 shows an exploded perspective view representing a general structure of a first embodiment of an optical switch according to the present invention.

As shown in FIG. 3, a silica-based optical waveguide layer 2 is formed on a silicon substrate 1. Typically, the flame hydrolysis deposition method, the ion beam sputtering method, the electron beam evaporation method, etc. can be used for depositing the optical waveguide layer 2. First, a lower cladding layer is deposited on the silicon substrate 1, and then dopant such as germanium is added to this layer to deposit a core layer having a larger refractive index than the cladding layer. Subsequently, optical waveguides 3a, 3b crossing each other are produced on the core layer utilizing the combined method of photolithography and dry etching. Furthermore, an upper cladding layer is deposited on the core layer to complete an optical waveguide layer 2.

Subsequently, lower-layer electric wirings 4a, 4b, micro heaters 5, through holes 6, upper-layer electric wirings 7, and an insulating layer 8 are produced on the optical waveguide layer 2. The micro heaters 5 can be produced utilizing a thin metal film such as titanium or chromium which has a relatively high resistance. The lower-layer electric wirings 4a, 4b, the through holes 6, and the upper-layer electric wirings 7 can be made, utilizing a thin metal film of low resistance. The insulating layer 8 can be made utilizing silica or the like. The sputtering method or the vacuum evaporation method is used for sequentially depositing each thin film. Furthermore, the combined method of photolithography and dry etching is used for sequentially producing, in order, the required lower-layer electric wirings 4a, 4b, micro heaters 5, through holes 6, and upper-layer electric wirings 7.

That is, each of the micro heaters 5 is made near the crossing points between the optical waveguides 3a, 3b, and the lower-layer electric wirings 4a, 4b, which are first electric wirings, connect together those ends of the micro heaters 5 that are located on the same side thereof, the micro heaters 5 being arranged in a row direction of the crossing points arranged in a matrix. The upper-layer electric wirings 7, which are second electric wirings, connect each of the micro heaters 5 being arranged in a column direction of the crossing points arranged in the matrix via the through holes 6. The insulating layer 8 is interposed between the lower-layer electric wirings 4a, 4b and the upper-layer electric wirings 7 so as to insulate the direct connections between the lower-layer electric wirings 4a, 4b and the upper-layer electric wirings 7. In this case, the lower-layer electric wirings 4a, 4b are both connected to a positive electrode, or one of them is connected to the positive electrode, while the other is connected to a negative electrode. The upper-layer electric wirings 7 are connected to the ground.

In this embodiment, after the upper-layer electric wirings 7 have been produced, an insulating layer 8' is also deposited as a passivation film, and a connecting layer 10 consisting of amorphous silicon or the like is deposited on the insulating layer 8' so that a substrate 11 of Pyrex Glass is anodically bonded to an optical waveguide substrate 15 to cover it (the details will be described below).

Subsequently, the combined method of photolithography and dry etching or another method is used for forming slits 9 at the crossing points between the optical waveguides 3a, 3b.

Then, utilizing the combined method of photolithography and dry etching or another method, a part of the connecting layer 10 and insulating layer 8' is removed to expose the upper-layer electric wirings 7 and the lower-layer electric wirings 4 to the exterior. The exposed portion is used for electric wiring output ports for power supply. Through the aforementioned processes, manufacturing the optical waveguide substrate 15 is accomplished.

Subsequently, the substrate 11 made of Pyrex Glass (trade mark) and the optical waveguide substrate 15 are bonded together by anodic bonding. Bypass slits 12, main injection paths 13, and sub injection paths 14 are formed beforehand on a bonding surface of the substrate 11 utilizing the combined method of photolithography and dry etching or another method. Each of the bypass slits 12 is U-shaped so that one end of the corresponding slit 9 is in communication with the other. Each of the main injection paths 13 is formed between adjacent elements to a row direction thereof and has both ends in communication with the exterior. One end of each of the sub injection paths 14 is in communication with the corresponding slit 9 in each element and the other end in communication with a part of the corresponding main injection path 13 which is nearest to the slit 9.

Thus, to bond the substrate 11 and the optical waveguide substrate 15 together, one end of each of the sub injection paths 14 is set in communication with the corresponding slit 9, and opposite ends of each bypass slit 12 are bonded to the corresponding ends of the corresponding slit 9 by positioning the corresponding ends of the bypass slit 12 and slit 9 so as to communicate with each other. In addition, for bonding, both surfaces to be bonded must be smooth and specular. Thus, if recesses and projections are formed on the bonding surface of the optical waveguide substrate 15 during production of the optical waveguides 3a, 3b, the micro heaters 5, or the like, the bonding surface is finished to be smooth by polishing or the like before bonding.

Figure 4:
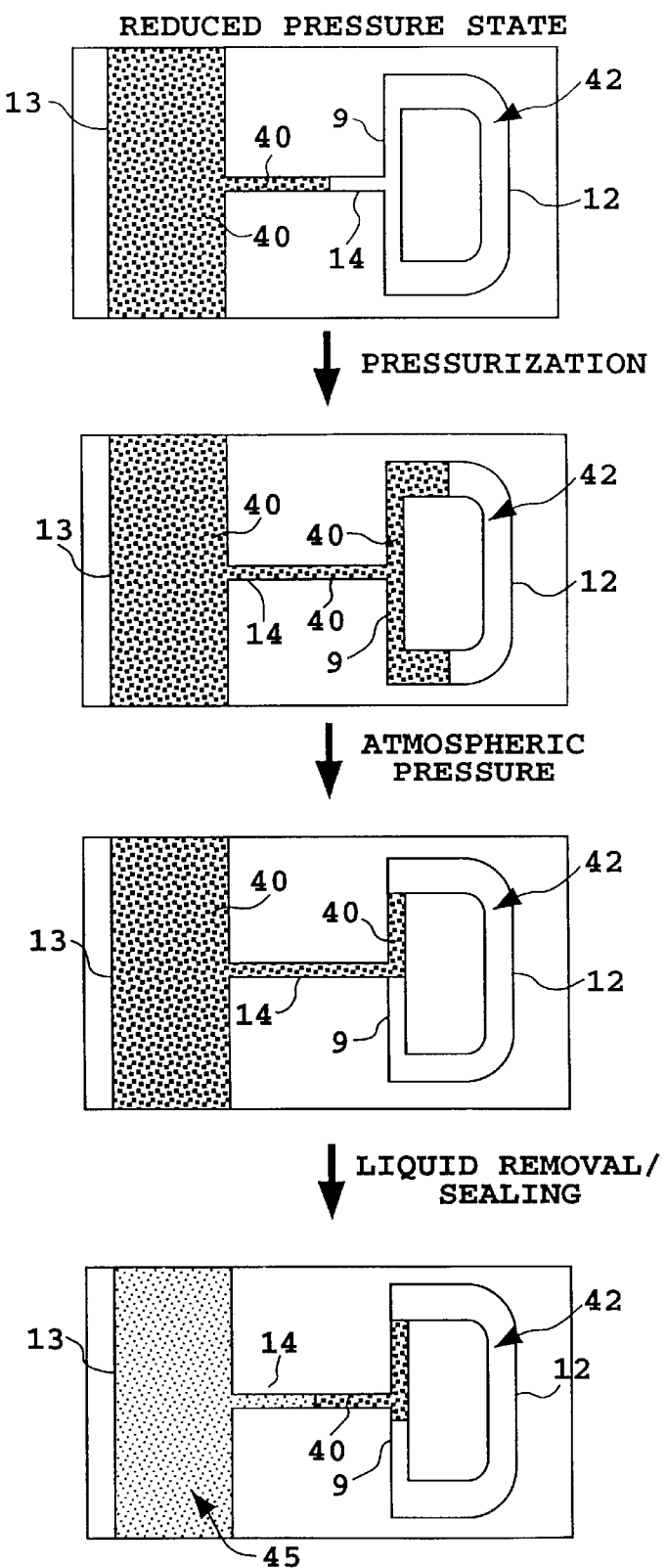
FIG. 4 shows a typical injection process of a refractive index-matching liquid in the first embodiment of the optical switch according to the present invention.

After bonding, a refractive index-matching liquid is injected and sealed in accordance with the typical process drawing shown in FIG. 4. The slit 9 in FIG. 4 is actually inclined substantially at 45° (135) from the corresponding sub injection path 14.

At first, a refractive index-matching liquid that is liquid having predetermined optical characteristics is injected into the slit 9 at the crossing points between the optical waveguides 3a, 3b, from the main injection path 13 via the sub injection path 14. In FIG. 4, when the atmospheric pressure is reduced by a predetermined amount to inject a refractive index-matching liquid 40 into the slit from one end of the main injection path 13, the liquid 40 flows toward the other end of the main injection path 13 and reaches to one end of the sub injection path 14. Since, however, a slit 9 side of the sub injection path 14 is closed by anodic bonding, the refractive index-matching liquid 40 does not enter the slit 9 but reaches to the other end of the main injection path 13. Once the refractive index-matching liquid 40 has reached to the other end of the main injection path 13, the pressure is increased back to the atmospheric level. Then, the external pressure and the pressure within the slit 9 are balanced, so that the volume of gas 42 (air) in the slit 9 decreases to allow the refractive index-matching liquid 40 to be injected into the slit 9.

The injecting the refractive index-matching liquid 40 in this manner eliminates the needs for individually controlling the amount of refractive index-matching liquid 40 injected into the slit 9. That is, since the value of pressure reduction can be easily calculated from the volumes of the slit 9, sub injection paths 14a, 14b, and bypass slit 13 and from the amount of liquid to be injected, a required amount of the refractive index-matching liquid 40 can be injected at one time into each slit 9 by controlling the pressure. In addition, the refractive index-matching liquid 40 can be injected into a plurality of slits 9 from one main injection path 13 to lessen the length of paths required for injection of the refractive index-matching liquid 40, thereby facilitating size reduction and improving productivity.

Once the refractive index-matching liquid 40 has been injected, an unwanted part of the refractive index-matching liquid 40 is removed, and epoxy resin or the like is then applied so as to cover opposite ends of the main injection path 13. Then, the epoxy resin is hardened for sealing. The sealing allows the interior of the main injection path 13 to be shielded from its exterior and accomplishes stable maintainance of the amount and quality and the like of refractive index-matching liquid 40, extending over a long period of time.

In addition, before the opposite ends of the main injection path 13 are sealed and after the refractive index-matching liquid 40 remaining in the main injection path 13 is removed by jetting gas or the like, sealing agent 45 such as epoxy resin can be applied so as to cover the opposite ends of the main injection path 13, and then can be hardened for sealing. In this case, in the purpose of facilitating the entry of the sealing agent 45 into the main injection path 13, a large sectional size of the main injection path 13 is desirable. Furthermore, in the purpose of restraining the effects on the slit 9 of the removal of the residual refractive index-matching liquid 40 by jetting gas or the like, a small sectional size of the sub injection path 14 is desirable.

To switch the optical path, the micro heaters 5 are allowed to generate heat via the lower-layer electric wirings 4 and the upper-layer electric wirings 7, which are exposed from the ends of the optical waveguide substrate 15. Thus, the circuit is configured so that intermediate portions between the upper-layer electric wirings 7 are separately grounded within a driving circuit for the micro heaters 5.

As described above, the arrangement of the electric wirings 4a, 4b in the row direction and the electric wirings 7 in the column direction, for actuating the micro heaters 5, allows the plurality of micro heaters 5 to perform utilizing the set of electric wirings 4a, 4b. As described above, by arranging the electric wirings 4a, 4b for actuating the micro heaters 5, in the row direction, while arranging the electric wirings 7 in the column direction, the set of electric wirings 4a, 4b, 7 can be used for actuating the plurality of micro heaters 5. Accordingly, the area required to form the electric wirings 4a, 4b, 7 can be reduced to diminish the area of the optical waveguide substrate 15 and thus the scale of the drive circuit for the micro heaters 5. That is, size reduction is facilitated and productivity can be improved.

In the above embodiment, the refractive index-matching liquid is injected into the slit 9 from each main injection path 13, via the sub injection path 14 located at one side of the path 13. On the other hand, if the sub injection paths 14 are allowed to be in communication with each other across the opposite sides of each main injection path 13, the refractive index-matching liquid is injected from each main injection path 13 into the slits 9 located at the opposite sides of the path 13. Consequently, the number of main injection paths 13 can be reduced to further facilitate size reduction while improving productivity. In this case, for the sake of the layout, a new bypass slit must be formed at the other side of the main injection path 13 and opposite to the original slit 12 with respect to the slit 9.

According to this embodiment, in the optical matrix switch having, in the row and column directions, the plurality of elements for which the optical path is switched, the micro heaters are used for heating and moving the liquid with predetermined optical characteristics and sealed in the slit at each crossing point between the crossing optical waveguides, thereby facilitating the size reduction of this optical switch while improving its productivity.

(Second Embodiment)

Figure 5:
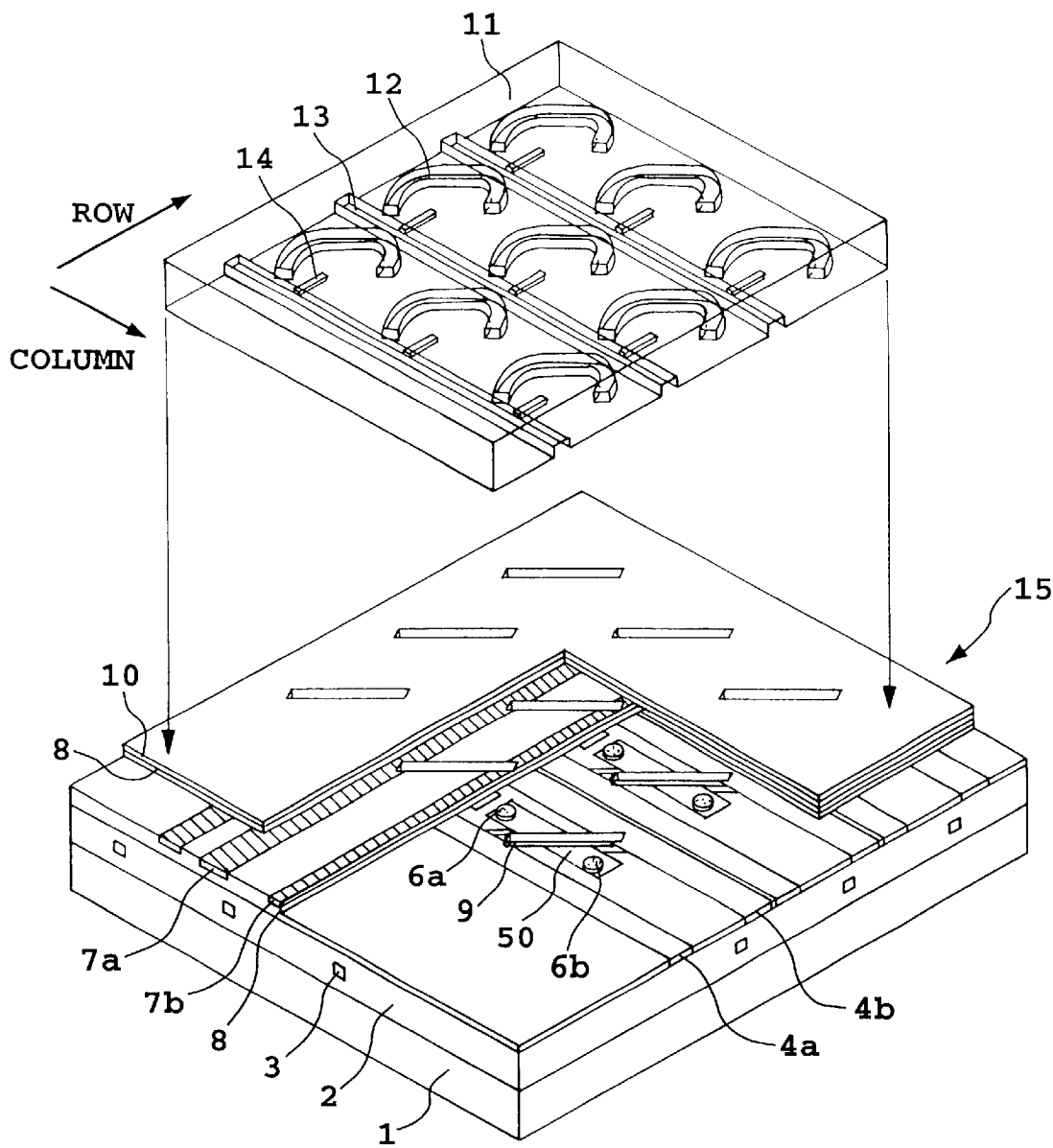
FIG. 5 shows an exploded perspective view representing a general structure of a second embodiment of an optical switch according to the present invention.
Figure 6:
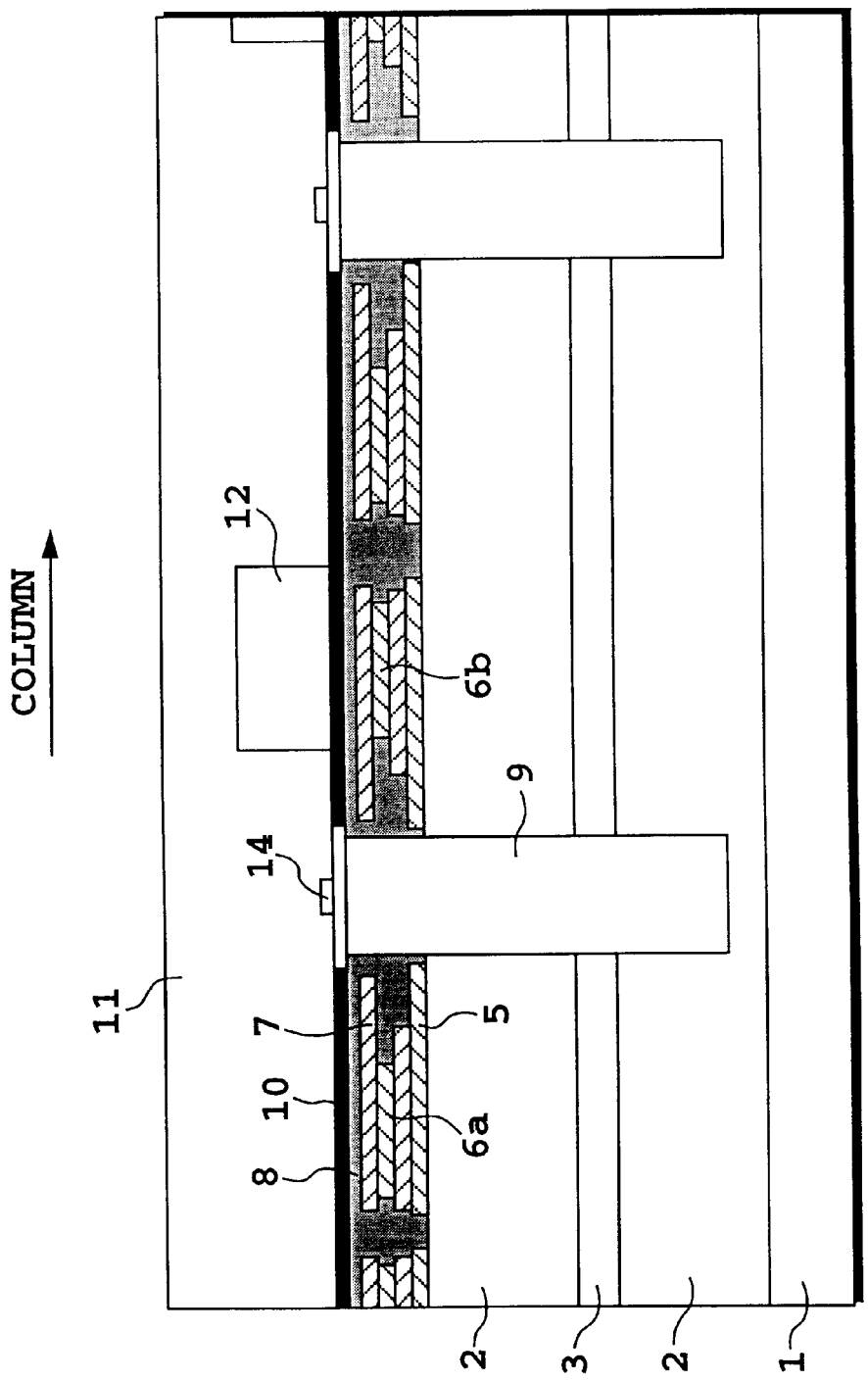
FIG. 6 shows a sectional view representing a general structure of the second embodiment of the optical switch according to the present invention.

A second embodiment of an optical switch according to the present invention will be described with reference to FIGS. 5 and 6. FIG. 5 shows an exploded perspective view of a general structure of this optical switch, and FIG. 6 shows its sectional view. This sectional view applies to the optical switch according to the first embodiment (FIG. 3).

The general structure of the optical switch according to this embodiment and a method for manufacturing this optical switch are similar to those in the first embodiment. Differences between these embodiments will be chiefly described below.

In terms of the structure, as shown in FIGS. 5 and 6, a pair of through holes 6a, 6b are formed around a slit 9 at each crossing point and, similarly, a pair of upper-layer electric wirings 7a, 7b are formed. A heater section 50 located near the crossing point is coupled directly to wirings 4a, 4b and to the wirings 7a, 7b via the through holes 6a, 6b.

Figure 7:
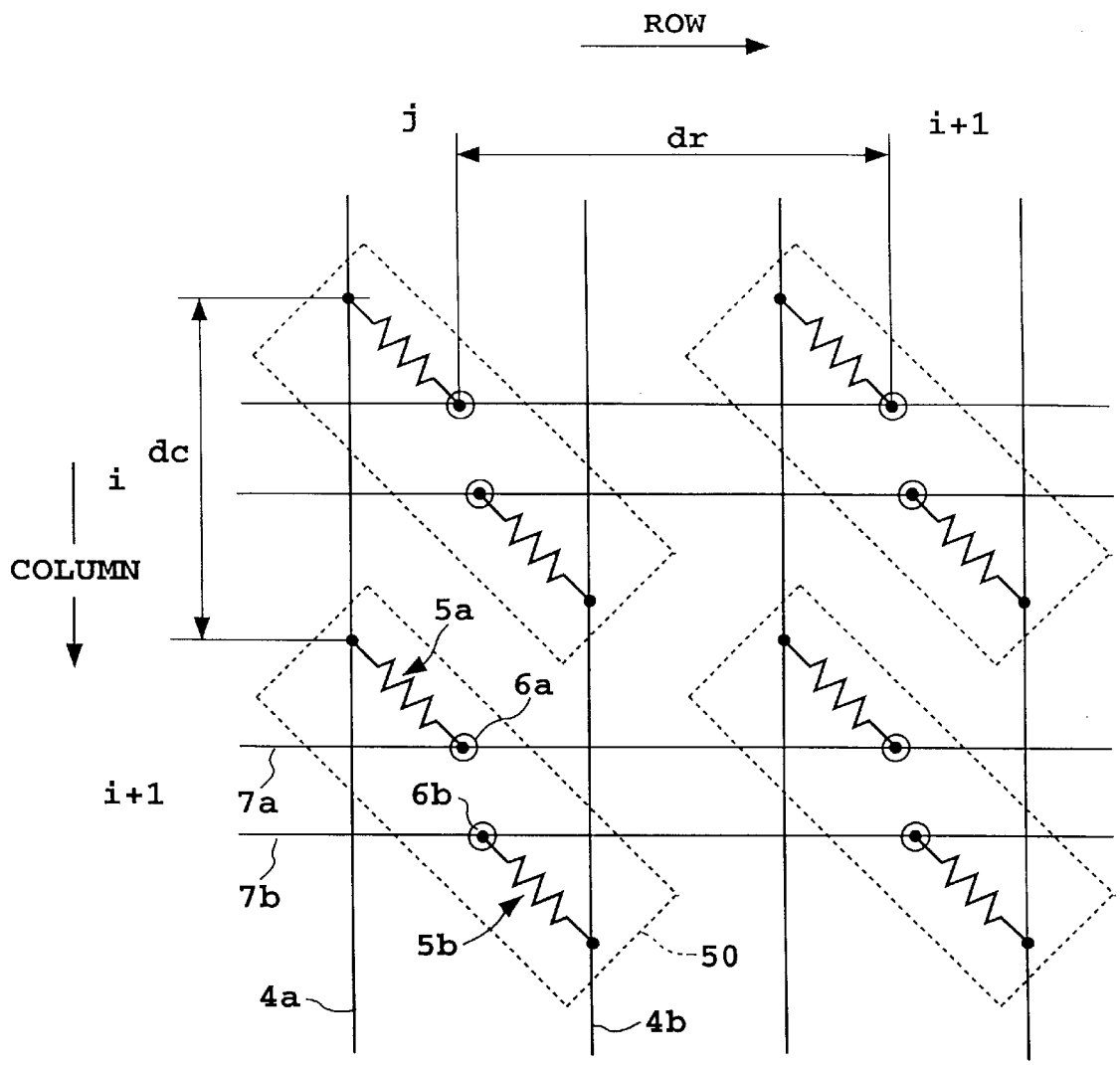
FIG. 7 shows an electric wiring diagram of the second embodiment of the optical switch according to the present invention.

Accordingly, electric connections in this embodiment are different from those in the first embodiment, and the heater section 50 comprises a pair of micro heaters 5a, 5b, as shown in FIG. 7. In this manner, plural sets of lower-layer electric wirings 4a, 4b are formed in a row direction of a matrix, while plural sets of upper-layer electric wirings 7a, 7b are formed in a column direction of the matrix, thereby forming as many sets of lower-layer electric wirings 4a, 4b as the rows of the matrix, and as many sets of upper-layer electric wirings 7a, 7b as the columns thereof.

The two upper-layer electric wirings and the two lower-layer electric wirings are provided for one element, and each of the wirings is connected to either of the electric wirings 5a, 5b directly or via the through holes 6a, 6b. These connections serve to eliminate leakage current, which is a problem of the prior art. Consequently, while one of the micro heaters of one element is generating heat, the other micro heater can be completely hindered from generating heat. As a result, an effective temperature gradient is generated within the slit 9 to enable a refractive index-matching liquid to be smoothly moved.

Furthermore, the micro heaters 5a, 5b in FIG. 7 are assumed to have an equal resistance value, which is defined as R. In addition, apart, with a length dc, of the electric wiring 4a which extends from an i-th micro heater to an (i+1)-th micro heater in the row direction is assumed to have a resistance value Rd, while a part, with a length dr, of the electric wiring 4a which extends from a j-th micro heater to a (j+1)-th micro heater in the column direction is assumed to have a resistance value Rr (=Rd).

According to this embodiment, the lower-layer electric wirings 4a, 4b, the electric wirings 5a, 5b, and the upper-layer electric wirings 7a, 7b are formed so that $(Rr/R)=(Rd/R)\leq 0.01$ is allowed. This resistance ratio can be achieved because an insulating layer 8 insulates the upper-layer electric wirings 7a, 7b from the lower-layer electric wirings 4a, 4b to enable the effective use of all parts of each element except for the slits 9 such that the the upper-layer electric wirings 7a, 7b and the lower-layer electric wirings 4a, 4b are formed in these parts (not shown).

Figure 8:
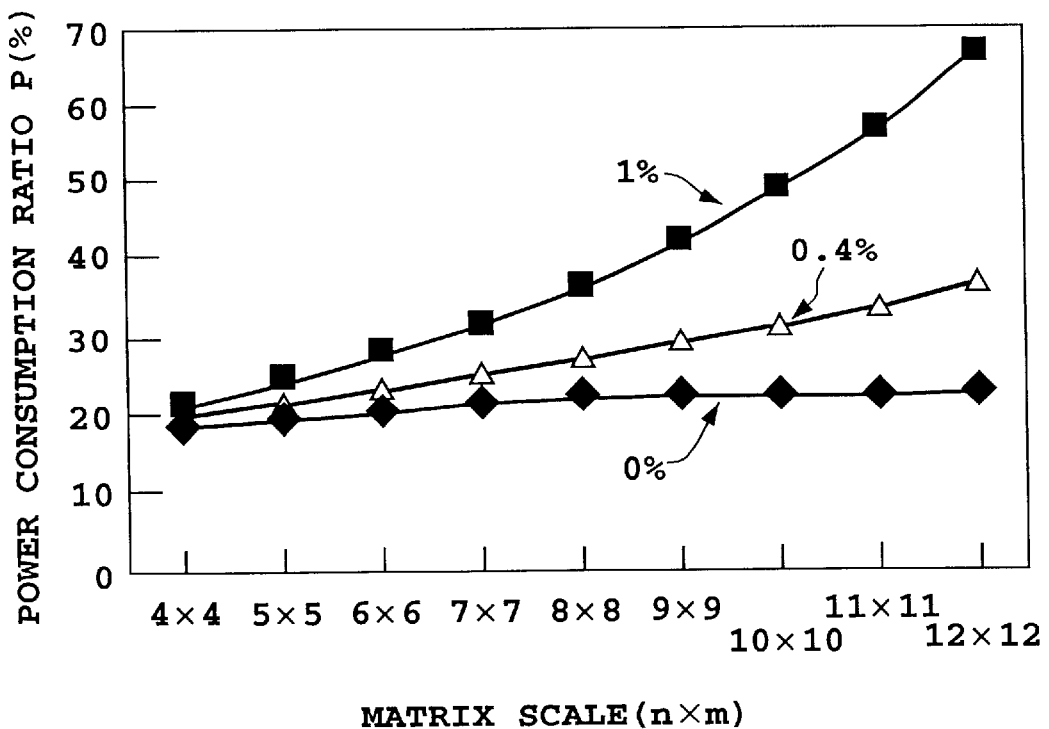
FIG. 8 shows a diagram of the relationship between the matrix scale and the power consumption ratio of micro heaters, relative to a resistance value of electric wirings in the second embodiment of the optical switch according to the present invention.

FIG. 8 shows a relationship between the matrix scale (n×m) and power consumption ratio P observed when the resistance ratio is set equal to 1, 0.4, and 0%. The power consumption ratio P on the axis of ordinate is (the maximum power consumption by undesired micro heaters)/(the power consumption by desired micro heaters). At a resistance ratio of 0%, the power consumption ratio can be maintained at about 20% regardless of the matrix size, and at a resistance ratio of 1%, the power consumption ratio can be reduced down to a predetermined value or smaller depending on the matrix scale.

The characteristic shown in FIG. 8 is obtained because the thin metal film is used for forming the large upper-layer electric wirings 7a, 7b and the large lower-layer electric wirings 4a, 4b in order to allow electric energy to be more efficiently applied to the micro heaters. Due to this characteristic, this embodiment is effective in restraining, despite an increase in matrix scale, malfunction such as erroneous switching of an optical path or variations in light intensity in the other optical paths caused by heating the liquid in elements other than desired ones.

Furthermore, as shown in FIGS. 7 and 8, by configuring the switch so that the number n of micro heaters connected to the first electric wirings (lower-layer electric wirings 4a, 4b) in the same row direction is the same as the number m of micro heaters connected to second electric wirings (the lower-layer electric wirings 7a, 7b) in the same column direction, the power consumption ratio P can be reduced, and variations, in light intensity in the optical paths passing through the elements other than desired ones, can be restrained.

(Third Embodiment)

A third embodiment of an optical switch according to the present invention will be described with reference to FIGS. 5 and 9. In this case, the micro heater 5 in FIG. 5 is assumed to be a heater section 90 as shown in parentheses. This embodiment provides an optical switch that eliminates leakage current, which is a problem of the prior art, by simply adding some parts without changing the basic structure and wiring of the first embodiment. The sectional view in FIG. 6 also applies to this embodiment.

Figure 9:
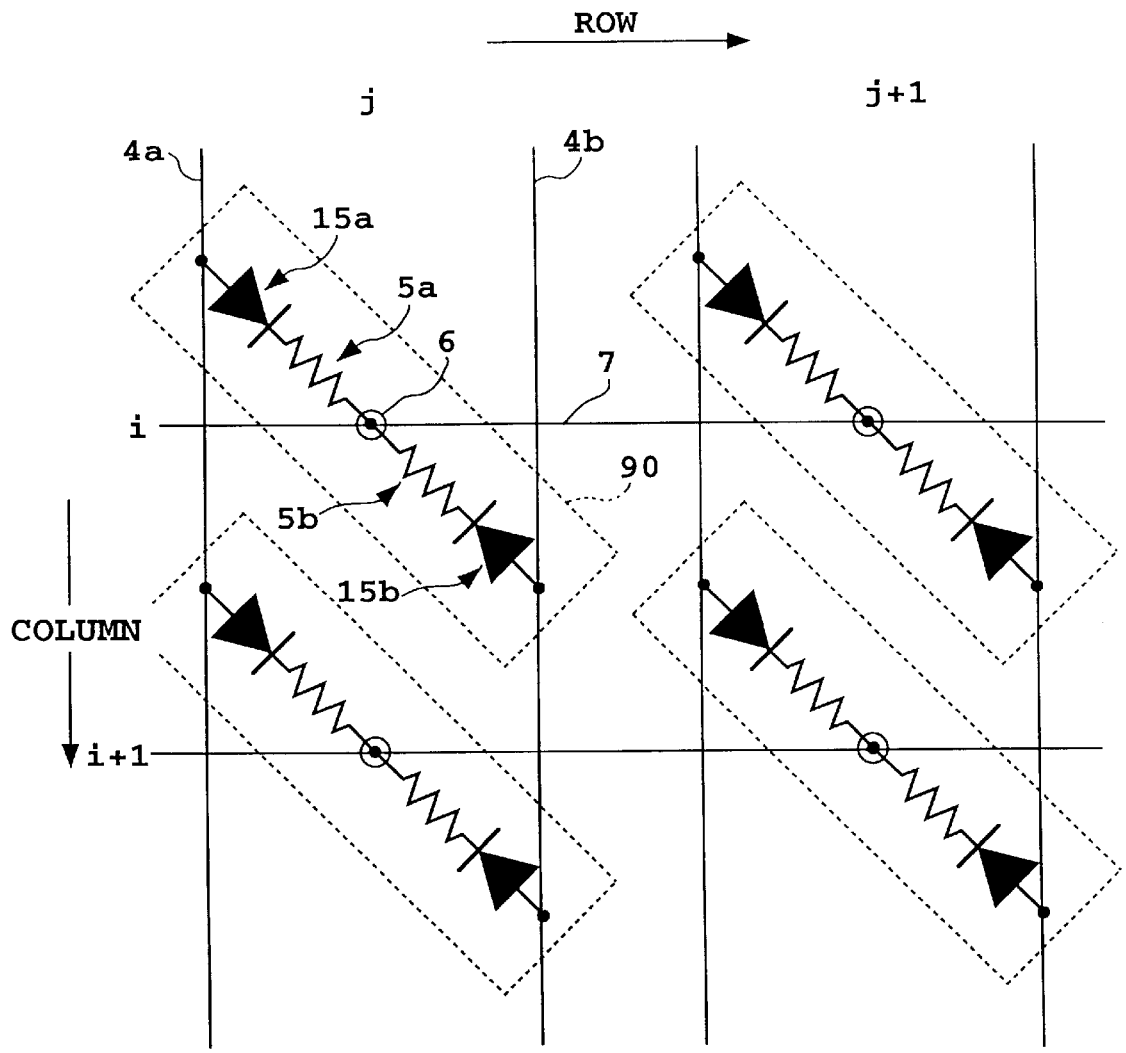
FIG. 9 shows an electric wiring diagram of a third embodiment of an optical switch according to the present invention.

In FIG. 9, the heater section 90 comprises two micro heaters 5a, 5b connected in series to backflow preventing diodes 15a, 15b, respectively so that each diode is connected in opposite polarity. These two series circuits are connected in series. A through hole 6 is commonly connected to both of the series circuits. An anode of the diode 15a is directly connected to a lower-layer electric wiring 4a, whereas an anode of the diode 15b is directly connected to a lower-layer electric wiring 4b. It is needless to say that an insulating layer 8 is interposed between an upper-layer electric wiring 7 and lower-layer electric wirings 4a, 4b.

According to this embodiment, by eliminating leakage current with this simple configuration utilizing the backflow preventing diodes, desired micro heaters alone can be allowed to effectively generate heat, thereby providing a small optical matrix switch that enables power consumption reduction and that is optically excellent because it avoids variations in light intensity in the optical paths passing through the elements other than desired ones.

The present invention has been described in detail with respect to preferred embodiments, and it will now be apparent from the foregoing to those skilled in the art that changes and modifications may be made without departing from the invention in its broader aspect and it is the intention, therefore, in the apparent claims to cover all such changes and modifications as fall within the true spirit of the invention.

What is claimed is:

1. An optical switch comprising a plurality of elements arranged in each of a row and a column direction thereof, each of the elements comprising slit located at corresponding crossing point between an optical waveguide extending to a row direction and an optical waveguide extending to the column direction, heating means, provided near each of said slit, with a predetermined resistance value, and liquid with predetermined optical characteristics which moves within said slit depending on heat generated by said heating means, wherein said liquid being moved to switch optical paths at said crossing point between said optical waveguides, said optical switch comprising:

first electric wirings connecting said heating means of the elements in the same row direction together in condition that a ratio of the resistance value of each heating means to said predetermined resistance value has a predetermined value or smaller;

second electric wirings connecting said heating means of the elements in the same column direction together in condition that a ratio of the resistance value of each heating means to said predetermined resistance value has a predetermined value or smaller; and an insulating layer interposed between said first electric wirings and said second electric wirings.

2. An optical switch according to claim 1 wherein:

the number of said heating means of said elements in said same row direction is equal to the number of said heating means of said elements in said same column direction.

3. An optical switch according to claim 1 wherein:

said heating means are provided in pair, wherein:

said first electric wirings include a first line connected to one end of said heating means and a second line connected to the other end of said heating means, and said second electric wirings include a third line connected to one end of said heating means and a fourth line connected to the other end of said heating means.

4. An optical switch comprising a plurality of elements arranged in each of a row and a column direction thereof, each of the elements comprising slit located at corresponding crossing point between an optical waveguide extending to a row direction and an optical waveguide extending to the column direction, a pair of heating means provided near each of said slit, and liquid with predetermined optical characteristics which moves within said slit depending on heat generated by either of said pair of heating means, wherein said liquid being moved to switch optical paths at said crossing points between said optical waveguides, the optical switch comprising:

a first series circuit having first backflow prevention means connected to one of said pair of heating means;

a second series circuit having second backflow prevention means connected to the other of said pair of heating means;

first electric wirings connected to said first and second series circuits in common in the same row direction;

second electric wirings independently connected to said first and second series circuits in the same column direction; and an insulating layer interposed between said first electric wirings and said second electric wirings.

5. An optical switch comprising a plurality of elements arranged in each of a row and a column direction thereof, each of the elements comprising slit located at corresponding crossing point between an optical waveguide extending to a row direction and an optical waveguide extending to the column direction, heating means provided near each of said slit, and liquid with predetermined optical characteristics which moves within said slit depending on heat generated by said heating means, wherein said liquid being moved to switch optical paths at said crossing point between said optical waveguides, said optical switch comprising:

main injection paths each formed between adjacent said elements to the row or column direction of said element and having opposite ends in communication with an exterior; and sub injection paths each having one end in communication with a corresponding one of said slit in said element, and the other end in communication with a portion of said main injection path which is nearest to said slit.

* * * * *